United States Patent
Holtgraver

(10) Patent No.: US 12,146,589 B2
(45) Date of Patent: Nov. 19, 2024

(54) ACTUATOR ASSEMBLY FOR CONDUCTING PARTIAL STROKE TESTING

(71) Applicant: QTRCO, Inc., Tomball, TX (US)

(72) Inventor: Edward G. Holtgraver, Tomball, TX (US)

(*) Notice: Subject to any disclaimer, the term of this patent is extended or adjusted under 35 U.S.C. 154(b) by 184 days.

(21) Appl. No.: 17/695,020

(22) Filed: Mar. 15, 2022

(65) Prior Publication Data
US 2022/0299132 A1    Sep. 22, 2022

Related U.S. Application Data

(60) Provisional application No. 63/161,579, filed on Mar. 16, 2021.

(51) Int. Cl.
   *F16K 37/00*   (2006.01)
   *F15B 15/20*   (2006.01)
   *F16K 31/122*  (2006.01)

(52) U.S. Cl.
   CPC .......... *F16K 37/0083* (2013.01); *F15B 15/20* (2013.01); *F16K 31/1221* (2013.01); *F16K 31/1225* (2013.01)

(58) Field of Classification Search
   None
   See application file for complete search history.

(56) References Cited

U.S. PATENT DOCUMENTS

| | | |
|---|---|---|
| 3,261,266 A | 7/1966 | Ledeen et al. |
| 3,818,808 A | 6/1974 | Shafer |
| 3,824,901 A | 7/1974 | Shafer |
| 5,492,050 A | 2/1996 | Holtgraver |
| 5,601,110 A | 2/1997 | Rembert et al. |
| 5,789,719 A | 8/1998 | Pary et al. |
| 6,209,443 B1 | 4/2001 | Perez |
| 6,633,015 B2 | 10/2003 | Nguyen et al. |
| 7,698,991 B2 | 4/2010 | Sato et al. |
| 7,718,916 B2* | 5/2010 | Tenzer ................. B23K 11/314 219/89 |
| 8,056,466 B2 | 11/2011 | Bravo et al. |
| 8,087,316 B2 | 1/2012 | Holtgraver |
| 8,863,596 B2 | 10/2014 | Holtgraver |
| 8,925,895 B2 | 1/2015 | Takemoto |
| 9,810,245 B2 | 11/2017 | Jaccoby et al. |
| 10,132,337 B2 | 11/2018 | Holtgraver et al. |
| 10,533,583 B2 | 1/2020 | Holtgraver et al. |
| 2012/0211681 A1 | 8/2012 | Wang |
| 2018/0135665 A1* | 5/2018 | Holtgraver .......... F15B 15/1409 |

* cited by examiner

*Primary Examiner* — Brandi N Hopkins
*Assistant Examiner* — Nigel H Plumb
(74) *Attorney, Agent, or Firm* — Werner IP Law, P.C.

(57) ABSTRACT

An actuator assembly which has a primary force module having a compression spring can be is compressed by a first fluid pressure-operated piston reciprocally mounted in the primary force module. There is a tandem piston module connected to the primary force module which has a second fluid-activated piston. When the spring of the primary force module is compressed, indicating that an attached valve is in the open position, the tandem module is actuated to apply a counter balancing force against the primary piston which allows the spring to expand and move the primary piston to a position which is sufficient to permit movement of the valve element of the actuated valve to indicate the valve is not stuck in an open position.

7 Claims, 4 Drawing Sheets

ACTUATOR ASSEMBLY FOR CONDUCTING PARTIAL STROKE TESTING

CROSS REFERENCE TO RELATED APPLICATION

This application claims priority to U.S. Application No. 63/161,579 filed on Mar. 16, 2021, the disclosure of which is incorporated herein by reference for all purposes.

FIELD OF THE INVENTION

The present invention relates to linear actuators and, more particularly, linear actuator assemblies which can conduct partial stroke testing.

BACKGROUND OF THE INVENTION

State-of-the-art emergency shutdown (ESD) systems, which control shut-off valves, have a number of features to detect plant or process failures and typically include redundancies for added reliability. However, such systems may not provide for the testing of shut-off valves themselves, other than full stroking the valve. However, the problem with full stroking or completely closing the valve is that it causes an undesirable disruption in the process. To alleviate the problem, partial stroke testing systems have been developed. In a partial stroke test (PST), a valve is partially closed in order to confirm that it is not struck in an open position.

PST is not only applicable to safety related applications but can also be used to enhance the operation of the valve. For example, in many process applications, the chemical composition of the flowing stream can cause material to build up on the valve internal body and trim surfaces. Over time this build-up may cause the valve to "stick" in that position and not stroke. PST can be used to simply "exercise" the valve while allowing it to partially stroke, keeping the valve surfaces that are required to move free from material build up.

SUMMARY OF THE INVENTION

In one aspect, the present invention relates to a linear actuator assembly which can be used with rising stem valves and some rotary vales.

In another aspect, the present invention relates to a linear actuator assembly which can conduct PST.

In another aspect, the present invention relates to a linear actuator assembly for use with rising stem valves which can conduct PST.

These and further features and advantages of the present invention will become apparent from the following detailed description, wherein reference is made to the figures in the accompanying drawings.

DETAILED DESCRIPTION OF PREFERRED EMBODIMENTS

Figure 1:
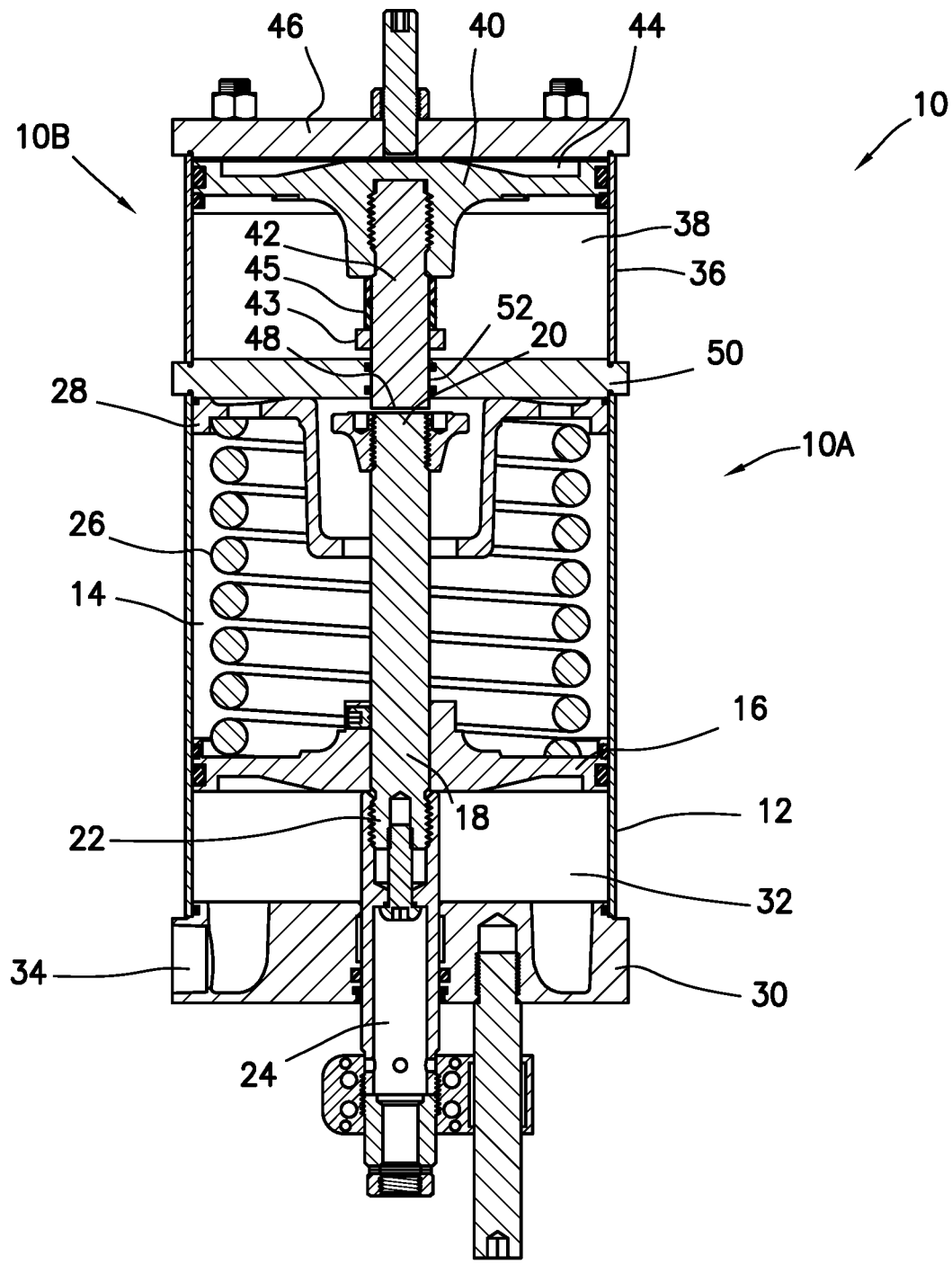
FIG. 1 is an elevational view, partly in section, showing one embodiment of an actuator assembly in a first condition.

Embodiments of the invention are described more fully hereafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the apparatus/assembly in use or operation in addition to the orientation depicted in the figures. For example, if the apparatus/assembly in the figures is turned over, elements described as being "below" or "beneath" other elements or features would then be oriented "above" the other elements or features. Thus, the exemplary term "below" can encompass both an orientation of above and below. The apparatus/assembly may be otherwise oriented (rotated 90 degrees or at other orientations) and the spatially relative descriptors used herein may likewise be interpreted accordingly.

Referring first to FIG. 1, an embodiment of the actuator assembly of the present invention, shown generally as 10, comprises a force module 10A and a tandem piston assembly 10B. Force module 10A comprises a casing 12 forming a cylindrical chamber 14. Reciprocally mounted in chamber 14 piston 16 which is connected to a piston rod 18, piston rod 18 having a first free end 20 and a second end 22 which is connected in a well-known manner to a linkage 24, by which assembly 10 can be operatively connected to a rising stem valve shaft (not shown) to operate the valve. It will be appreciated that the actuator assembly of the present invention can also be used with rotary valves as well.

A compression spring 26 is disposed in chamber 14 and on one end engages a spring retainer 28 and on the other end engages primary piston 16. An end cap 30 is connected to casing 12 and forms a generally annular fluid chamber 32, there being a port 34 through which fluid pressure, e.g., air pressure, can be introduced into chamber 32 and act against piston 16 to compress spring 26. Chamber 32 provides a first fluid pressure source. In this position, and as well-known to those skilled in the art, the valve to which actuator assembly 10 is connected would be in the open position.

Tandem piston module 10B comprises a cylindrical cartridge 36 which is connectable to casing 12. Cartridge 36 forms a chamber 38 in which is disposed a tandem piston 40 which is connected to a piston rod 42. There is a fluid chamber 44 formed between piston 40 and end cap 46 which is open communication with a port (not shown) in end cap 46, chamber 44 providing a second fluid pressure source. It will thus be apparent that by pressurizing fluid chamber 44, piston 40 and piston rod 42 can be urged toward primary piston 16 whereby free end 48 of piston rod 42 engages free end 20 of piston rod 18 and urges piston rod 18 and hence piston 16 toward its terminal position. There is a guide or interface plate 50 having an aperture 52 therethrough, piston rod 42 being slidably receivable through aperture 52. Interface plate 50 effectively forms a divider between chambers 38 and 14.

As thus described, the piston assembly of the present invention is in a condition wherein spring 26 has been compressed under the force of piston 16 which has moved piston rod 18 upwardly.

Figure 2:
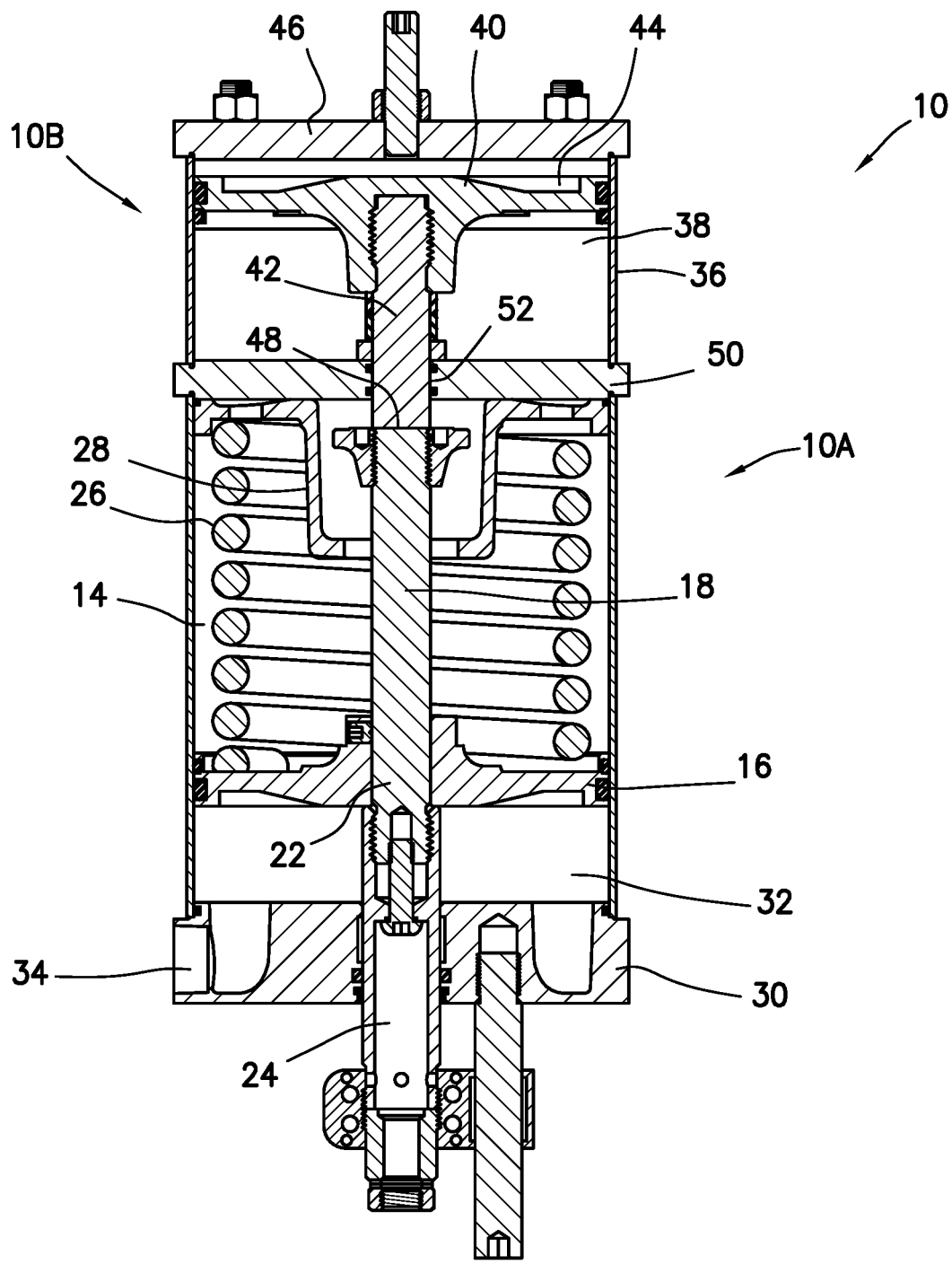
FIG. 2 is a view similar to FIG. 1 but showing the actuator assembly in a second condition.

Turning now to FIG. 2, it can be seen that chamber 44 has been pressurized sufficient to move piston 40, and hence piston rod 42, downwardly until free end 48 of piston rod 42 contacts free end 20 of piston rod 18. The force exerted by piston rod 42 on piston rod 18 would be sufficient to at least equal the upward force applied by piston 16. In fact, the downward force exerted by piston 40 need only be sufficient to upset the force balance between primary piston 16 and spring 26 and thereby enable the downward spring force of spring 26 to exceed the net upward force exerted by piston 16. This reduction in compressive force against spring 26 allows spring 26 to expand sufficiently to allow spring 26 to exert a downward force on piston 16 and hence piston rod 18 such that, via linkage 24, the valve element to which assembly 10 is connected is even slightly moved toward a closed position indicating it is not stuck in an open position. It should be noted that any said movement by the valve element includes movement by well-known linkages.

Sensors (not shown, but well known in the art) can communicate that there has been downward movement of piston rod 18 indicating that a PST has occurred. At this point, pressure can be released from pressure chamber 44 which then allows piston 16 to fully compress spring 26 again.

Figure 3:
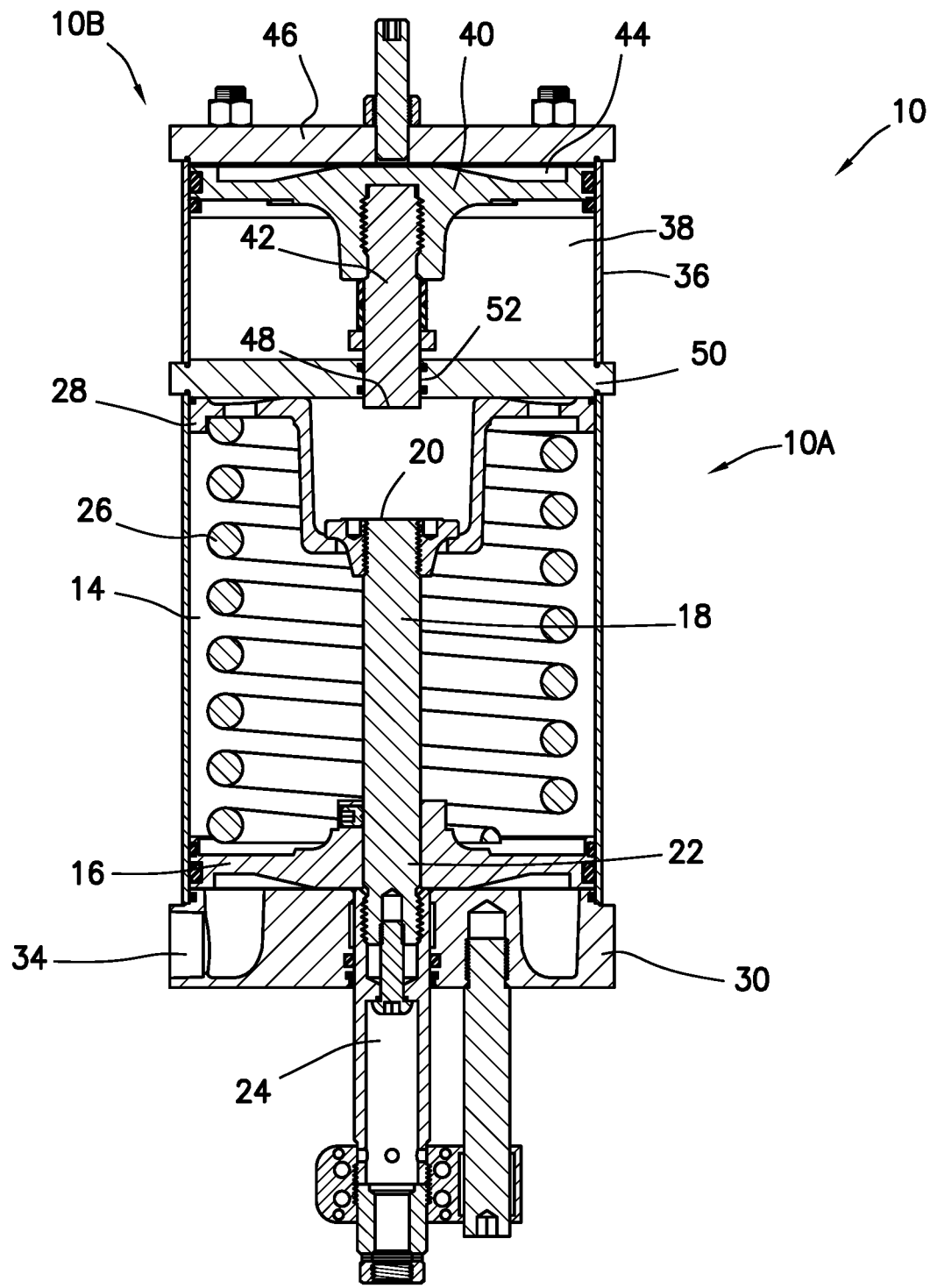
FIG. 3 is a view similar to FIG. 1 but showing the actuator assembly in a third condition.

FIG. 3 shows the assembly 10 when pressure has been exhausted from pressure chamber 32 thereby allowing spring 26 to expand and move piston 16 downwardly to its terminal, i.e., non-actuating, position.

Although not shown, it will be appreciated that a small bleed port could extend into plate 50 and be in open communication with chamber 38 whereby any pressure built up as a result of the travel of piston 40 can escape.

One of the advantages of the assembly of the present invention is that a standard basic linear actuator can be retrofitted to include the tandem piston assembly. The normal end cap which would be connected to casing 12 can now be used as the end cap for the tandem piston module, the guide plate 50 being substituted for the normal end cap.

Another feature of the assembly of the present invention is that the stroke of the tandem piston can be controlled by means of a selectively adjustable stop collar 43. Thus, one or more spacers 45 can be used if desired.

It should be noted that at all times, the space between pistons 16 and 40 is generally at or near atmospheric pressure. This simplicity of design eliminates the need for seals, o-rings, or the like which would be necessary in a pressurized condition.

Figure 4:
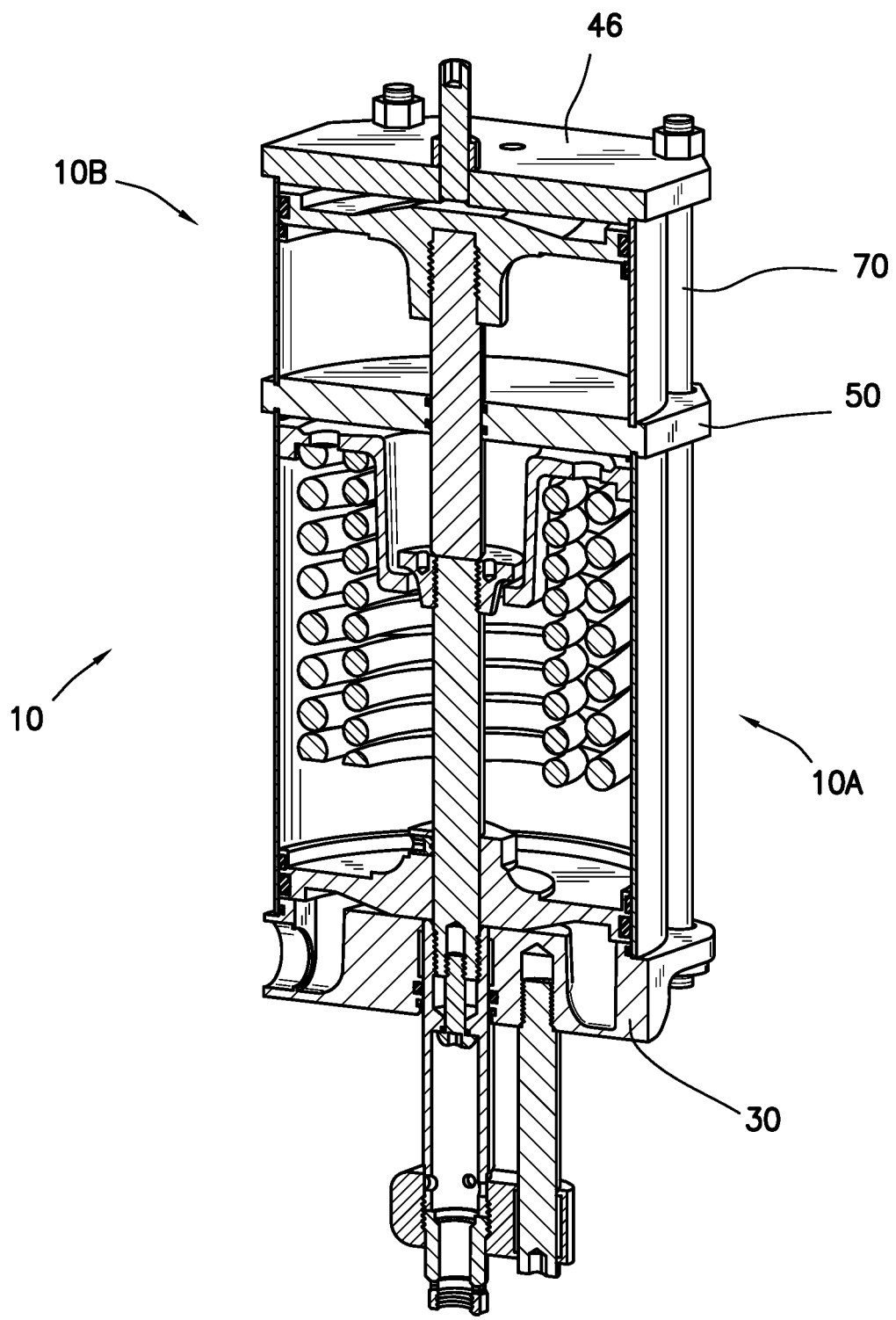
FIG. 4 is a view showing how the primary force module and the tandem piston module can be assembled.

As seen in FIG. 4, the primary force module and the tandem force module can be connected together using tie rods 70 extending through registering openings in end cap 46, plate 50, and end cap 30. Although, not shown in FIG. 4, the piston would be at its terminal position and the spring is in its relaxed position.

Thus, the tandem piston force (over a selectable length of travel), balances or exceeds the force of the main piston which enables the spring force to exceed the force from the main piston, resulting in travel and movement, perhaps ever so slight, of the piston rod of the main piston. The "slight" movement is generally sufficient to result in a detectable movement of the valve element of the valve toward the closed position.

As will be appreciated from the above description, the actuator assembly of the present invention provides a means to conduct a PST of a valve, inter alia, to confirm that the valve element is not stuck in an open position. In this regard, and starting with the position of the actuator assembly 10 shown in FIG. 3, and in normal operation, piston 16 would be actuated to compress spring 26 to the position as shown in FIG. 1. In this position, the valve to which the actuator assembly is attached is in the open position. To conduct a PST, pressure from fluid in chamber 44 is used to force piston 40 in the downward direction which concomitantly moves piston rod 42 until, as shown in FIG. 2, the free end 48 of piston rod 42 has contacted the free end 20 of piston rod 18. The pressure applied on piston 40 need only be sufficient so that the resultant force exerted by piston rod 42 against piston rod 18 substantially equals or is slightly greater than the force being applied by piston 16 against spring 26. Since piston rod 18 is connected to linkage 24 which in turn is connected to the valve element of an attached valve, any slight movement of piston rod 18 downwardly will permit slight movement of the valve element. This slight movement, which can be detected by many techniques means that the valve element is not stuck in the open position.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations, and modifications, including but not limited to those design alternatives specifically discussed herein, may be made in the practice of the invention without departing from its scope.

What is claimed is:

1. An actuator assembly comprising:
   a force module, said force module comprising:
      a casing defining a first piston chamber;
      a first piston mounted in said first piston chamber for reciprocal movement therein;
      a compression spring disposed in said first piston chamber, said compression spring exerting a biasing force on said first piston;
      a first piston rod connected to said first piston and having a first free end and a second end connectable to a reciprocally movable shaft;
      a first fluid pressure source selectively operable to apply a first force to said first piston in a first direction;
   a tandem piston module, said tandem piston module comprising:
      a cartridge forming a second piston chamber;
      a second piston mounted in said second piston chamber for reciprocal movement therein;
      a second piston rod having a first end connected to said second piston and a second free end;
      a second fluid pressure source selectively operable to apply a second force to said second piston in an opposite direction to said first direction whereby said biasing force and said second force together exceed said first force.

2. The actuator assembly of claim 1, wherein there is an interface plate between said casing and said cartridge.

3. The actuator assembly of claim 2, wherein said interface plate has a bore therethrough.

4. The actuator assembly of claim 3, wherein said free end of said second piston rod is slidable through said bore.

5. The actuator assembly of claim 1, wherein there is a space between said first piston and said second piston, and wherein the space between said first piston and said second piston is substantially at atmospheric pressure.

6. The actuator assembly of claim 1, wherein there is a selectively positionable stop carried by said second piston rod.

7. A method for conducting partial stroke testing of a valve comprising:
  (a) providing a force module and a tandem piston module connected to said force module, said force module comprising:
    a casing defining a first piston chamber;
    a first piston mounted in said first piston chamber for reciprocal movement therein;
    a compression spring disposed in said first piston chamber, said compression spring exerting a biasing force on said first piston;
    a first piston rod connected to said first piston and having a first free end and a second end operatively attachable to a valve element of said valve;
    a first fluid pressure source selectively operable to apply a first force to said first piston in a first direction;
  said tandem piston module comprising:
    a cartridge forming a second piston chamber;
    a second piston mounted in said second piston chamber for reciprocal movement therein;
    a second piston rod having a first end connected to said second piston and a second free end;
    a second fluid pressure source selectively operable to apply a second force to said second piston in an opposite direction to said first direction
  (b) when said compression spring is at least partially compressed, applying pressure from said second fluid pressure source to said second piston to move said second piston and said second piston rod sufficiently to engage said free end of said second piston rod with said free end of said first piston rod to exceed the force applied to said compression spring by said first piston.

\* \* \* \* \*